United States Patent [19]
Klenk et al.

[11] Patent Number: 5,428,991
[45] Date of Patent: Jul. 4, 1995

[54] PROCESS FOR ADAPTING MECHANICAL TOLERANCES OF A PICK-UP WHEEL

[75] Inventors: Martin Klenk, Backnang; Anton Kantschar, Eberdingen-Hochdorf; Werner Mueller, Untergruppenbach; Wolfgang Wimmer, Erlenbach, all of Germany

[73] Assignee: Robert Bosch GmbH, Stuttgart, Germany

[21] Appl. No.: 74,823

[22] PCT Filed: Sep. 20, 1993

[86] PCT No.: PCT/DE92/00839
§ 371 Date: Jun. 7, 1993
§ 102(e) Date: Jun. 7, 1993

[87] PCT Pub. No.: WO93/07497
PCT Pub. Date: Apr. 15, 1993

[30] Foreign Application Priority Data
Oct. 11, 1991 [DE] Germany ............ 41 33 679.8

[51] Int. Cl.⁶ ........................ G01M 15/00
[52] U.S. Cl. ........................... 73/116
[58] Field of Search ............. 73/116, 117.2, 117.3

[56] References Cited
U.S. PATENT DOCUMENTS

| | | |
|---|---|---|
| 4,445,087 | 4/1984 | Mehnert . |
| 4,569,027 | 2/1986 | Nakano et al. . |
| 4,972,333 | 11/1990 | Isikawa . |
| 5,117,681 | 6/1992 | Dosdall et al. ............ 73/116 |
| 5,200,899 | 4/1993 | Ribbens et al. ............ 73/116 |

FOREIGN PATENT DOCUMENTS

| | | |
|---|---|---|
| 3018496 | 11/1981 | Germany . |
| 3432872 | 3/1986 | Germany . |
| 4009285 | 3/1986 | Germany . |
| 8600415 | 1/1986 | WIPO . |

*Primary Examiner*—Robert Raevis
*Attorney, Agent, or Firm*—Michael J. Striker

[57] ABSTRACT

A process of adapting mechanical tolerances of a transmitter wheel provided with a plurality of approximately equidistant markings which are sensed by a pick-up supplying a pulse train whose time interval is measured and stored, includes connecting a transmitter wheel with a rotating shaft of an internal combustion engine, carrying out a check as to whether or not the internal combustion engine is in thrust operation, and placing a second and following time intervals in relation to a first time interval when the thrust operation is detected.

7 Claims, 3 Drawing Sheets

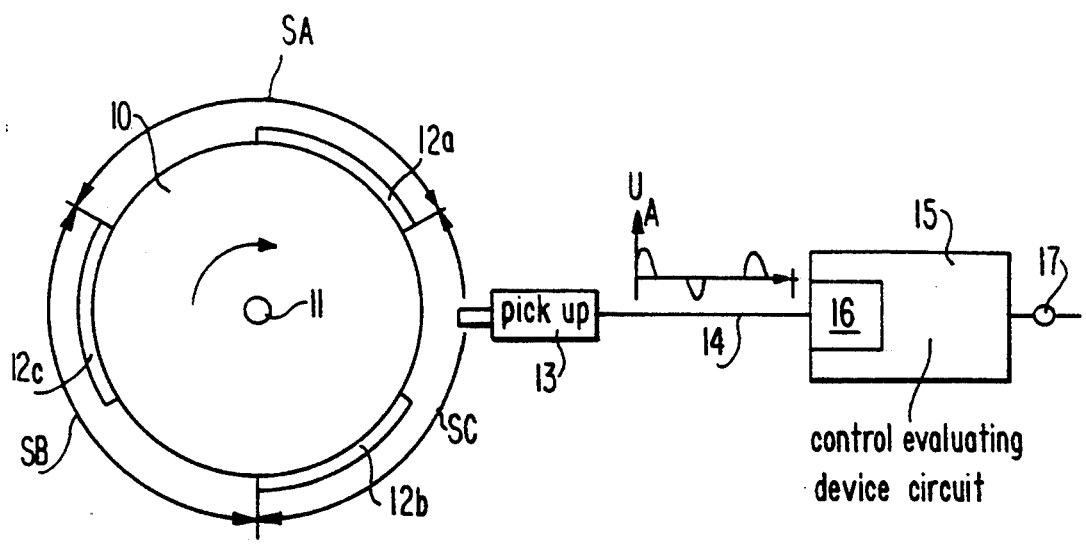
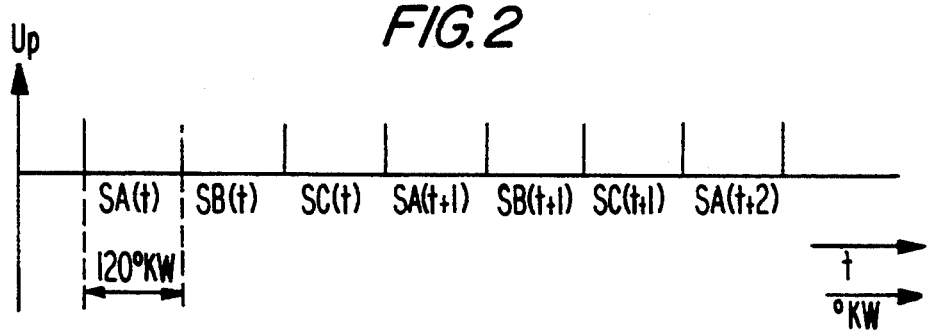
FIG. 2

PROCESS FOR ADAPTING MECHANICAL TOLERANCES OF A PICK-UP WHEEL

BACKGROUND OF THE INVENTION

The present invention relates to a process for adapting the mechanical tolerances of a transmitter wheel.

More particularly, it relates to a process for adapting mechanical tolerances of a transmitter wheel with a number of approximately equidistant markings sensed by a pickup which supplies a pulse train whose time interval is measured and stored.

To detect a determined position of a shaft, e.g. the crankshaft or the camshaft of an internal combustion engine, it is known to fasten a transmitter disk having markings on its surface on the respective shaft and to sense the markings with a stationary pickup. The markings passing by the pickup, e.g. an inductive pickup, induce voltage pulses which are processed in a subsequent evaluating circuit or in a subsequent control device, the rate of rotation of the shaft being calculated from the time intervals between the voltage pulses.

A device which determines the rate of rotation and angular position of the shaft in this way is known e.g. from EP 0 188 433. A transmitter wheel with a plurality of angle marks is sensed and the obtained voltage is converted into a square-wave voltage. Information on the rate of rotation is obtained from the time intervals between identical angle mark flanks. This known device has the disadvantage either that the angle marks must be executed very exactly so that the intervals between identical angle mark flanks are very precise, or that the rate of rotation can only be determined in an inexact manner.

In the first case, a very expensive and cost-intensive production is required. In the second case, the measurement of the rate of rotation is so inexact that it cannot be used for modern internal combustion engines.

A method and a device for measuring an angle is known from DE-OS 30 18 496 in which a transmitter wheel connected with a rotating shaft and having a plurality of markings is sensed by a pickup. To increase accuracy, the intervals between the individual angle marks are first measured out in a calibrating run; these measured values are then stored and included in a subsequent evaluating process for measuring an angle.

However, the known device and process do not show that it is possible to determine the rate of rotation of the shaft exactly from the time interval between identical angle mark flanks. Also, the known device and the known process have the disadvantage that a calibrating run must be carried out prior to operation and a checking of or adaptation to changed parameters, if required, can no longer be effected during operation.

SUMMARY OF THE INVENTION

Accordingly, it is an object of the present invention to provide a process for adapting mechanical tolerances of a pick-up wheel, which avoids the disadvantages of the prior art.

In keeping with these objects and with others which will become apparent hereinafter, one feature of the present invention resides, briefly stated, in a process for adapting mechanical tolerances of a transmitter wheel, in accordance with which the transmitter wheel is connected with a rotating shaft of an internal combustion engine, a check is carried out as to whether or not the internal combustion engine is in thrust operation, and the second and following time intervals are placed in relation to the first time interval when thrust operation is detected.

When the process is performed in accordance with the present invention, it has the advantage over the prior art that adaptation of the transmitter wheel tolerances can also be effected during operation under conditions which ensure that no changes or fluctuations in the rate of rotation occur, which is generally the case in thrust operation.

By checking the adaptation values it can be established at any time how far the adaptation has already progressed. By filtering the correction values and filtering the adaptation values, a particularly exact adaptation can be carried out.

It is particularly advantageous that the rate of rotation can be determined in a very precise manner after adaptation from the individual pulse intervals, even when the angle marks have not been arranged in a particularly exact manner so that segments of different length occur, since the different segment lengths are already compensated for.

It is possible for misfires to be detected in a particularly reliable way with the aid of this exact rate of rotation, since the fluctuations in the rate of rotation caused by the occurrence of combustion misfires can be reliably detected. Accordingly, it is likewise possible for the smooth running of the internal combustion engine to be determined in a very reliable manner.

In accordance with another feature of the present invention, the transmitter wheel is connected with the crank shaft of an internal combustion engine and the number of marks is equal to half the number of cylinders of the internal combustion engine.

Still another feature of the present invention is that the first time interval is the segment duration (SA(t)), the second time interval is (SB(t)) and the third time interval is (SC(t)).

Still another feature of the present invention is that the deviations of the time intervals from one another are filtered and the filtered measurement values are used as adaptation values. The deviation of the time interval differences from the adaptation values can be filtered in a second filter and compared with a threshold.

Still a further feature of the present invention is that the rate of rotation can be calculated from every segment duration. The rates of rotation corrected by adaptation can be also compared with one another for determining the fluctuations in the rate of rotation, in that a threshold value is formed which is compared with the fluctuations of the rate of rotation for determining noisy running.

The threshold value can be limited to a minimal value dependent on the rate of rotation when the adaptation is not yet complete. A combustion misfire can be detected from the determined fluctuations in the rate of rotation when the fluctuations in the rate of rotation exceed the threshold.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows the basic construction of the transmitter wheel and pickup and the subsequent evaluating circuit;

FIG. 2 shows a typical pulse train which is delivered by the pickup but has already been processed;

DESCRIPTION OF THE PREFERRED EMBODIMENTS

Figure 3:
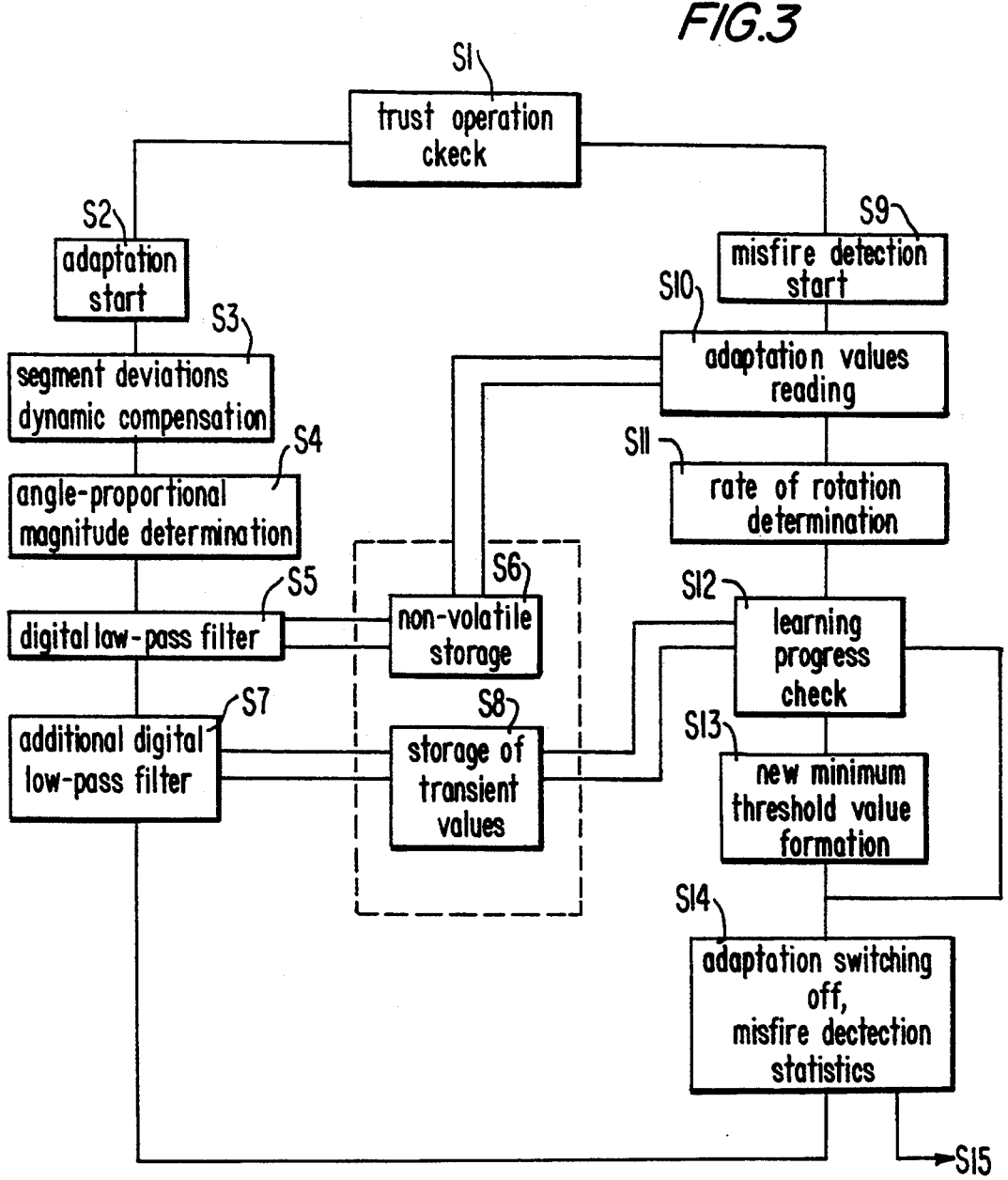
FIG. 3 shows a flow chart for illustrating the process according to the invention.

FIG. 1 shows a transmitter wheel 10 which is connected with the crankshaft 11 of an internal combustion engine and has three markings 12a, 12b and 12c at its surface. A pickup 13 which is connected with a control device 15 via a line 14 is arranged in the vicinity of the surface of the transmitter wheel 10.

In addition, an evaluating circuit 16 in which the signals supplied by the pickup 13 are suitably processed is arranged between the pickup 13 and the control device 15 or in the control device 15 itself. Further, according to FIG. 1, a display 17 is connected with the control device 15 and is controlled by the latter.

The area between the front part of the marking 12a and the front part of the marking 12c is designated as segment SA; two additional segments SB and SC are formed in a similar manner.

The crankshaft 11 and accordingly also the transmitter wheel 10 rotate when the internal combustion engine is operated. The beginning and end of every angle mark generates a positive or a negative voltage pulse in the pickup 13. The pulse train is shown in FIG. 1 as $U_A(t)$.

The transmitter wheel shown in FIG. 1 with the three segments SA, SB and SC is suitable for a six-cylinder engine in which six pulses are required per combustion cycle for an optimal evaluation. The calculations indicated in the following likewise refer to a six-cylinder engine.

The pulse train $U_p(t)$ indicated in FIG. 2 which is achieved by converting $U_A(t)$ and is evaluated in the control device 15 has the following characteristics: the intervals between the individual pulses are 120° KW with reference to the crankshaft position. With reference to time t, the interval between the first two pulses SA(t) corresponds to the time period elapsing while segment SA passes the pickup 13. Similarly, SB (t) and SC (t) are the time periods elapsing during the passage of segments SB and SC. SA(t), SB(t) and SC(t) are designated as segment durations.

SA (t+1), SB (t+1) and SC (t+1) are the corresponding times one crankshaft revolution later. The same applies in a corresponding sense to the other times SA (t+2), and so on.

The process according to the invention for adapting mechanical tolerances of a transmitter wheel will now be discussed with reference to the flow chart shown in FIG. 3.

In a first step S1 a check is made as to whether or not the engine is in thrust operation. In addition, a check is made as to whether or not the engine is in the zero load range and whether or not the rate of rotation is in a range between 1800 and 3000 r.p.m. These two conditions are prerequisites for thrust operation.

If it is detected in the first step S1 that the engine is in thrust operation, the adaptation is begun in an another step S2. It is possible to adapt the angle marks in thrust operation since the noisy running virtually reaches a zero value due to the centrifugal mass of the engine in thrust operation, that is, there are no fluctuations in the rate of rotation. During such an operating state, it can be assumed that all intervals between equidistant angle marks must be equal. A measured deviation can therefore be used for purposes of correcting the mechanical deviations for the angle marks.

For the purpose of adaptation, the segment deviations $\Delta AB(t)$, $\Delta AC(t)$ ... are first calculated in a step S3. Individual segment durations SA (t), SB (t), SC (t), SA (t+1), ... are measured in addition. Calculation is begun from these measured times after one camshaft revolution, that is, after three completed revolutions of the crankshaft. In so doing, the segment deviations are related to the segment SA. The computation itself is effected according to the following formulas:

$$\Delta AB(t) = SA(t) + \frac{SA(t + 2) - SA(t)}{Z} - SB(t)$$

$$\Delta AC(t) = SA(t) + \frac{2[SA(t + 2) - SA(t)]}{Z} - SC(t)$$

$$\Delta AB(t + 1) = SA(t) + \frac{4[SA(t + 2) - SA(t)]}{Z} - SB(t + 1)$$

$$\Delta AC(t + 1) = SA(t) + \frac{5[SA(t + 2) - SA(t)]}{Z} - SC(t + 1)$$

The factor Z in the denominator of the four equations corresponds to the number of cylinders which, in the present embodiment example, would be Z=6.

Since the calculation is carried out after a completed camshaft revolution, i.e. after two crankshaft revolutions, the segment duration of the third crankshaft revolution SA (t+2) must be adopted in the calculation to calculate the segment deviation in the first revolution $\Delta AB$ (t) or $\Delta AC$ (t).

The segment deviations $\Delta AB(t)$, $\Delta AC(t)$, ... calculated in step S3 are subjected to compensation of dynamic in step S4. The adaptation is interrupted when a maximum dynamic is exceeded, that is, when the segment duration difference SA (t+2)−SA (t) is too great.

Further, the smallest deviation for the correction of the rate of rotation is selected. In so doing, the two corresponding segment deviations $\alpha AB$ (t) and $\alpha AB$ (t+1), respectively, $\Delta AC$ (t) and $\Delta AC$ (t+1) are first checked to determine if their mathematical signs are the same. If the comparison shows that the two corresponding segment deviations have the same mathematical sign, the smaller of the two values is used as adaptation measurement value. This procedure ensures that only the content shared by both is utilized for adaptation.

The adaptation measurement value obtained for segments SB and SC are divided by the reference time segment SA (t) so that the deviation presents as an angle-proportional magnitude XSB or XSC which is not dependent on the rate of rotation.

If the mathematical signs of the two corresponding segment deviations are not the same, the corresponding adaptation measurement values XSB and XSC are set at zero.

In step S5, the adaptation measurement values XSB and XSC resulting at the end of step S4 are supplied to and filtered by a digital low-pass filter. The adaptation measurement values ASB (t) and ASC (t) which are thus obtained are calculated according to the following formulas:

$$ASB(t) = K1.ASB(t-1) + (1-K1).XSB$$

$$ASC(t) = K1.ASC(t-1) + (1-K1).XSC$$

The factor K1 represents a filter factor. It can have a value between 0 and 1, where a light averaging is effected at K1>0 and a heavy averaging is effected at K1<1.

Limiting the adaptation measurement values ASB (t) and ASC (t) to plausible maximum values increases the reliability of the process; adaptation measurement values which exceed this plausible limit are therefore not employed.

In step S6, the adaptation measurement values ASB (t) and ASC (t) obtained and filtered at the end of step 5 are stored in a nonvolatile storage of the control device and are accordingly available for further evaluations.

In step S7, the deviation of the adaptation measurement value XSB from the filtered value ASB is determined and filtered in an additional digital low-pass filter. In so doing, it is assumed that the deviation of the adaptation value XSC from the filtered value ASC or the deviation of all additional measurement values corresponding to the segment times in relation to corresponding filtered values have a relationship to one another similar to that between the deviation XSB and ASB. The corresponding transient values FE SB1 (t) and FE SB2 (t) are formed according to the following formula:

$$FB\ SB1(t) = K2.FE\ SB1(t-1) + (1-K2).[ASB(t)-XSB(t)]$$

$$FE\ SB2(t) = K2.FE\ SB2(t-1) + (1-K2).[ASB(t)-XSB(t)]$$

The second filter factor K2 can amount e.g. to 0.996. However, it should be substantially smaller than the factor K1 when the adaptation values are filtered.

The amount is formed by the two values FE SB1 and FE SB2 and when the amount of FE SB1 or FE SB2 is greater than a fixed value FREFmin, the noisy running reference value LUR is limited to a minimum value REFmin dependent on the rate of rotation. FREFmin corresponds to the tolerance value required for the function and REFmin is proportional to the tolerance value which can be realized without adaptation.

If the values FE SB1 and FE SB2 are less than FREFmin over a longer period of time, the adaptation can be switched off and the filter factor K1 can be increased. However, it can be reactivated for the next servicing. This is necessary particularly when the transmitter wheel or the control device is exchanged.

The transient values FE SB1 (t) and FE SB2 (t) obtained at the end of step S7 are stored in step S8 in a nonvolatile storage of the control device and are available for additional evaluations or calculations.

After restarting the adaptation or when first starting, the following values are given:
for the adaptation measurement values:
  XSB=XSC=0
for the adaptation average values:
  ASB=ASC=0
for the transient values:
  FE SB1=X

FE SB2=−X

X denotes a value corresponding to the greatest allowable tolerance in the manufacture of the transmitter wheel. The two extreme tolerance values are used as initial values for the filters.

When it is detected in stop S1 that the engine is not in thrust operation, normal engine control is effected in the control device. In addition, a step S9 is activated which ultimately triggers the misfire detection.

If the misfire detection is carried out before an adaptation is effected, the values predetermined when restarting or when first starting are used. The step sequence S2 to S8 need not necessarily be effected before the step sequence S9 to S14.

After the misfire detection begins, the adaptation values XSB, XSC stored in the nonvolatile storage are read in in step S10 and used for correcting the measurement values of the segment duration.

In so doing, the adaptation average value ASB and ASC (depending on the segment and number of cylinders) is multiplied by the segment duration, which gives the corrected segment duration with which the additional calculations for detecting the misfires are effected. No corrections are carried out for the segment SA.

The corrected segment durations SB(t), SC(t) and the uncorrected segment durations SA(t) are used in step S11 for exactly determining the rate of rotation, and the proportionality of the rate of rotation to the reciprocal value of the (corrected) segment duration is utilized in a manner known e.g. from DE-OS 28 07 376. In step S11 the noisy running is calculated from these precise values for the rate of rotation as is a threshold value or noisy running reference value Lur which is required for the misfire detection carried out in step S14.

The calculation of the noisy running or misfire detection is effected from the precise values for the rate of rotation in a conventional manner by comparing the changes in the rate of rotation with a predetermined threshold value and will not be discussed in more detail. Examples for such misfire detection are shown in DE-OS 39 17 978.

IN step S12 a check is made as to whether or not the learning progress is sufficient. If it is not, a new minimum value which is dependent on the rate of rotation is formed for the threshold value in step S13 and the misfire detection is then effected in step S14.

If is detected in step S12 that the learning progress is sufficient, the misfire detection is effected directly in step S14.

When determined limiting values are exceeded the adaptation is switched off in step S14. Moreover, this step also includes the setting up of statistics for the misfire detection.

In a further step S15, a display is effected as soon as a combustion misfire is detected.

Figure 4:
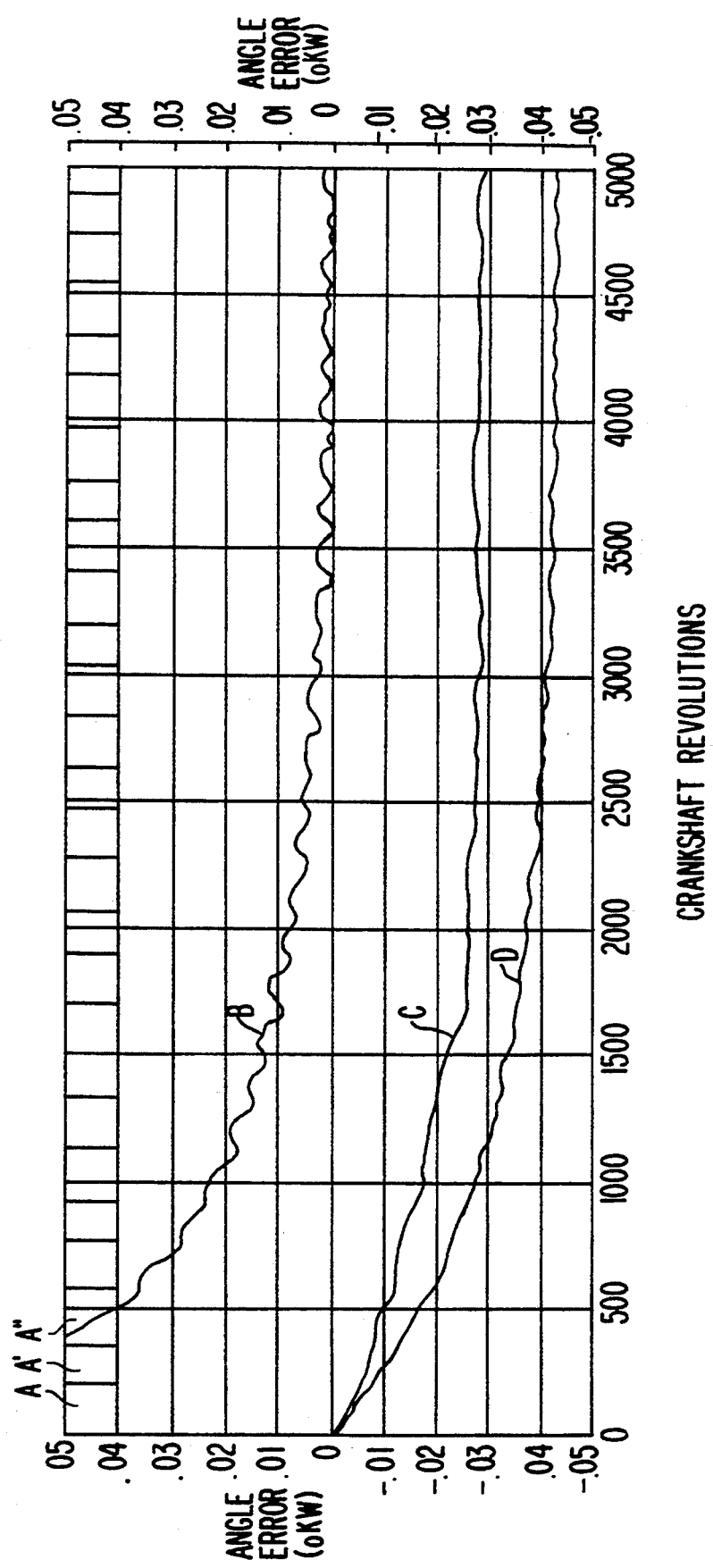
FIG. 4 shows the curve of the angle errors over the number of crankshaft revolutions.

In FIG. 4 the changes in the angle errors resulting from an evaluation are plotted as a function of a number of crankshaft revolutions. These angle errors were determined in thrust operation.

In the upper area of FIG. 4, a number A, A', A" of areas are plotted which are separated from one another by vertical lines. Each area between two such lines denotes a detected thrust area. By placing such areas together, a total area extending over 5000 crankshaft revolutions has been obtained, the adaptation being effected within this total area. The values shown in FIG. 4 result for the changes in the individual quantities. The upper curve B shows the changes for the transient effect of the filters; it approaches zero when the adaptation is built up. The middle curve C shows the angle error or segment deviation for the segment SB and the bottom curve D shows the angle error for the segment SC. The two values are first set to zero and reach their actual values as the adaptation progresses.

The embodiment example shown in FIG. 1 and the flow chart shown in FIG. 3 for the process for adapting mechanical tolerances of a transmitter wheel can be generalized extensively. Thus, for example, another transmitter wheel with a plurality of marks can be used. It is also possible to use a transmitter wheel with alternating magnetic characteristics at its surface. It must be ensured that the transmitter wheel 10 and pickup 13 are suitably adapted to one another, e.g. a transmitter wheel manufactured from ferromagnetic material can be sensed by an inductive sensor.

For internal combustion engines with more than or less than six cylinders, Z/2 segments are to be evaluated rather than three segments, where Z corresponds to the number of cylinders.

We claim:

1. A process of adapting mechanical tolerances of a transmitter wheel provided with a plurality of approximately equidistant markings which are sensed by a pickup supplying a pulse train whose time interval is measured and stored, the process comprising the steps of providing a number of markings which is equal to half the number of cylinders of the internal combustion engine connecting a transmitter wheel with a crank shaft of an internal combustion engine; carrying out a check as to whether or not the internal combustion engine is in thrust operation; selecting a second and following time intervals in relation to a first time interval when the thrust operation is detected by selecting the first time interval as a segment duration SA(t)), the second time interval as (SB(t)) and a third time interval as (SC(t)), so that a first segment of the transmission wheel is used as a reference segment and the segment duration (SA(t)) is measured during which the transmitter wheel is turned over an angle corresponding to the Segment (SA), and then the second time interval (SB(t)) and the third time interval (SC(t)) are measured and both the second time interval (SB(t)) and the third time interval (SC(t)) are referred to the first time interval (SA(t)); filtering the time deviations of the time intervals from one another; and using values of filtered deviations as adaptation values.

2. A process as defined in claim 1, wherein said connecting includes connecting the transmitter wheel with a crank shaft of the internal combustion engine; and further comprising the step of providing a number of the marks which is equal to half the number of cylinders of the internal combustion engine.

3. A process as defined in claim 1; and further comprising the step of calculating a rate of rotation from each of said segment durations.

4. A process as defined in claim 3; and further comprising the steps of correcting the rates of rotation by adaptation and comparing them with one another for determining fluctuations in the rate of rotation; forming a threshold value; and comparing the threshold value with the fluctuations of the rate of rotation for determining noisy running.

5. A process as defined in claim 4; and further comprising the step of limiting the threshold value to a minimum value dependent on the rate of rotation when the adaptation is not yet complete.

6. A process as defined in claim 4; and further comprising the step of determining misfire from the determined fluctuations in the rate of rotation when the fluctuations in the rate of rotation exceed the threshold value.

7. A process as defined in claim 1, wherein said filtering includes filtering the deviations of time interval differences from the adaptation values in a second filter and comparing them with a threshold.

* * * * *